Jan. 30, 1973   T. D. JOHNSON ET AL   3,714,393
SYSTEM FOR PRODUCING A CONSTANT NUMBER OF PULSES
PER UNIT LENGTH OF TRAVELING STRIP
Filed July 20, 1971   2 Sheets-Sheet 1

INVENTORS
THOMAS D. JOHNSON
DAVID F. WHALEN
ROBERT E. WHITE

United States Patent Office 3,714,393
Patented Jan. 30, 1973

3,714,393
SYSTEM FOR PRODUCING A CONSTANT NUMBER OF PULSES PER UNIT LENGTH OF TRAVELING STRIP
Thomas D. Johnson, David F. Whalen, and Robert E. White, Roanoke, Va., assignors to General Electric Company
Filed July 20, 1971, Ser. No. 164,278
Int. Cl. G06m 7/00
U.S. Cl. 235—92 DM                     9 Claims

ABSTRACT OF THE DISCLOSURE

A system for producing a constant number of pulses per unit length of a traveling strip passing a point. The constant number of pulses per unit length produced is independent of the tachometer selected, independent of the base frequency of the tachometer, and independent of variations in diameter of the roll in contact with the strip which generates the mechanical input to the tachometer. The system includes means easily adaptable to include factors which may be used to compensate for errors inherent in the process such as the shrinkage factor in the operation of a hot metal strip rolling mill which occurs upon the metal cooling to room temperature.

BACKGROUND OF THE INVENTION

This invention relates generally to a system for measuring the amount of strip material passing a particular point or the rate at which the strip material passes the particular point, and more particularly, to a system which produces a constant number of pulses per unit length of material passing the particular point.

This invention may be used with many different forms of elongated strip material on processing or manufacturing lines wherein elongated material having any desired cross-sectional configuration such as flat ribbon or wire-like material is processed in some manner. For example, the elongated strip material may be cut successively into predetermined lengths. For this application, such continuous elongated material shall be called strip material but it will be understood that this term covers ribbon-like material, wire-like material, or elongated material having any other cross-sectional configuration as for example an "I" beam shape.

This invention may be advantageously applied to a number of different uses in various environments. For example, this invention may be applied to monitor the material strip output by counting the number of pulses produced, may be used to measure the rate of travel of the strip material by measuring the pulse rate output or may be used to measure particular lengths of strip material passing a particular point so as to accurately divide the strip material into equal lengths by counting a predetermined number of pulses. The invention may be used in various environments such as rod and bar steel mills, sheet steel mills, paper manufacturing mills, cloth mills or in any other environment in which the amount of strip material passing a particular point is to be accurately monitored.

The continuous flow of strip-like material is quite advantageous in most high production manufacturing and processing operations as distinguished from operation on batches. However, for the end product, the strip material usually must be cut into shorter predetermined lengths. In order not to waste the strip material and to have uniformity in the end product, it is highly desirable that the predetermined lengths of cutoff strip be held to as close a tolerance as possible. In continuous flow strip mills today, the strip material is usually traveling at a speed of several thousand feet per minute. The end product is usually marketed in a predetermined length, and it is usually desired to divide the material into these predetermined lengths as accurately as possible while the strip material is passing by at a speed of several thousand feet per minute. Without an accurate measure of the amount of strip material passing a particular point, the strip material is usually divided into lengths slightly larger than the predetermined length in order to avoid erroneously dividing the material into lengths slightly shorter than the predetermined length and thereby making a divided length shorter than required and unsaleable. The end result is that the moving strip material is cut into lengths longer than the predetermined length and later cut at a standstill to the exact predetermined length, thereby producing as much as several feet of waste per each saleable predetermined length of strip material.

The applicability of this invention will be described particularly as applied for producing a control signal for operating the divide shears of a rod and bar steel mill. However, as described above, this invention is equally applicable for various monitoring uses in conjunction with various types of moving strip material. In a rod and bar steel mill, the rod or bar type of strip material may be traveling at a speed of from several hundred feet to several thousand feet per minute. It may be desirable to divide this strip material into lengths of 240 feet while the strip material is moving through the mill. It may be desirable to later divide this material into 60-foot lengths. However, it is noted that if the divide shears cut the material into a length of 239 feet, only three 60-foot sections could be produced with a 59 foot section of waste. Therefore, in the past, the strip material was usually divided into lengths of from 244 feet to 248 feet. Although this latter method avoids a 59 foot section of waste, it still produces 4 to 9 feet of waste per each division at the dividing shears. Thus, this oversized cutting, without the waste of any saleable lengths of strip material, could produce 3% waste. It is, therefore, highly desirable to have a system which accurately measures the amount of strip material passing a particular point in order to operate the divide shears at the proper time so as to divide the moving strip material accurately.

In a rod and bar steel mill there may be a number of roll stands. Each stand contains a pair of motor driven rolls through which the rod or bar type of strip material passes. Depending upon the desired diameter of the finished rod or bar product, the bar or rod strip material may exit from different stands. Tachometers are physically driven by these rolls. Depending upon which stand the strip material exits from, a different tachometer may be selected in order to provide an indication responsive to the strip material movement. Therefore, it is highly desirable to have a system which gives a constant number of pulses per unit length which is independent of the base frequency of the tachometer selected, the diameter of the particular roll which drives the selected tachometer, and other factors dependent upon the particular tachometer selected. The diameter of the roll which drives the selected tachometer may vary due to wear, replacement of a new roll for a worn roll, or variations in diameter due to heating caused by the hot metal rod or bar passing through the rolls.

DESCRIPTION OF THE PRIOR ART

It has been known in the prior art to use tachometers to generate a signal indicative of the rate at which strip material passes a particular point. It has also been known in the prior art to use detectors to sense the presence of the material at a particular point such as photoelectric cells and hot metal detectors. However, the prior art does not teach a system for producing a constant number of pulses per unit length of strip material passing a point in which the constant number of pulses per unit length is independent of the base frequency of the tachometers selected, or of other varying parameters such as variations in roll diameter.

SUMMARY OF THE INVENTION

Briefly stated, the essence of this invention is a system for producing a constant number of pulses per unit length of material passing a point. The system may be recalibrated each time a new section of strip material starts through the mill. Detectors or other means are used to indicate the times when the leading edge of the moving strip material reaches each of two points located a predetermined distance apart along the path of strip movement. A count is captured equal to the number of pulses generated by the selected tachometer during the time of travel of the leading edge of the strip from the first point to the second point. This captured count is then counted down by the pulse rate of the tachometer multiplied by a factor equal to the constant number of pulses per unit length desired, and further multiplied by the length between the two points expressed in the units of length desired. Each time the captured count is counted down to a predetermined count, an output pulse is generated. The captured count may be gated by suitable gating means into a count-up counter. This captured count may be transferred to a count-down counter. The count-down counter may be counted down by pulses at the pulse rate of the selected tachometer multiplied by the desired factor, which multiplication may be performed in a pulse rate multiplier. An output pulse is produced each time the count-down counter reaches a predetermined count. The constant number of pulses per unit length of strip material may also be generated in a computer programmed according to the above-described method.

BRIEF DESCRIPTION OF THE DRAWINGS

While the specification concludes with claims particularly pointing and distinctly claiming the subject matter which is regarded as the invention, it is believed that the invention will be better understood from the following description taken in connection with the accompanying drawings in which:

DESCRIPTION OF THE PREFERRED EMBODIMENTS

Figure 1:
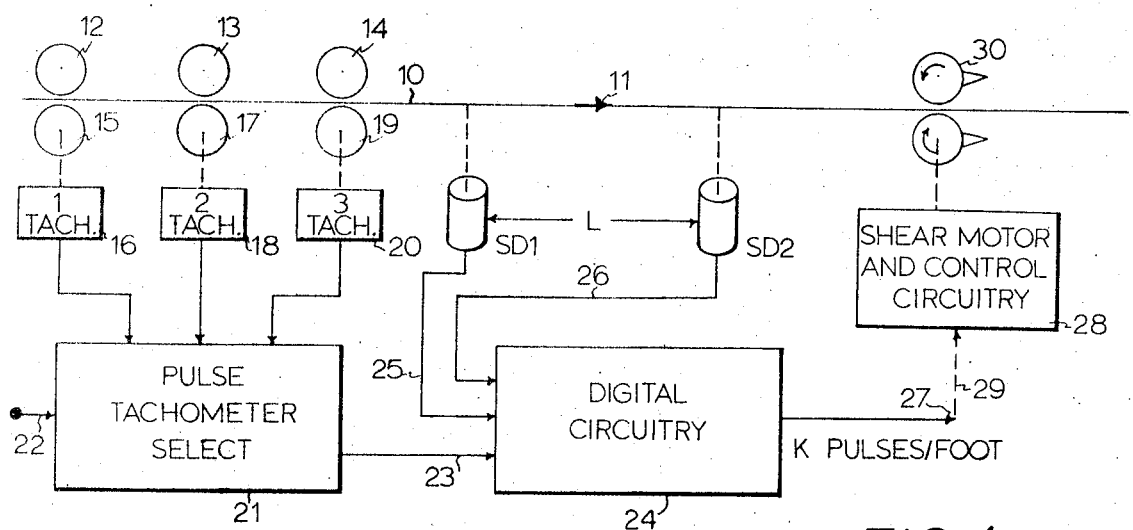
FIG. 1 is a schematic presentation of a continuous rolling mill train with a rotating shear for dividing the roller bar and the interconnection of the invention therewith.

Referring now, more particularly, to FIG. 1 to illustrate the principles of the invention, there is shown a rolling mill train having strip material 10 moving as indicated by arrow 11. Sets of rolls 12, 13 and 14 are shown with the strip material 10 passing between the rolls of each set. The roll sets 12, 13 and 14 are located on roll stands not shown. One of the rolls of each set of rolls 12, 13 and 14 has a tachometer physically connected thereto. Roll 15 of roll set 12 has a tachometer 16 physically connected thereto. Roll 17 of roll set 13 has tachometer 18 physically connected thereto, and roll 19 of roll set 14 has tachometer 20 physically connected thereto. The outputs of each of the tachometers is fed into a pulse tachometer select circuit 21. The select signal is normally an external "set-up" signal governed by operator action or the equivalent. One of the tachometer outputs is selected by a select signal applied to terminal 22 of pulse tachometer select circuit 21. The pulse tachometer select circuit 21 may be comprised of any suitable circuitry well-known in the art and may also include pulse shaping circuits such as monostable multivibrators (one shots) in order to clean up the tachometer input signal. The output of the pulse tachometer select circuit 21 is fed via line 23 to digital circuitry 24. The digital circuitry 24 also receives input signals from two strip detectors SD1 and SD2 via lines 25 and 26, respectively. The strip detectors SD1 and SD2 are located at a distance L apart as indicated in FIG. 1. This distance L is considered to be the distance between the points at which the strip is detected. This distance may be any suitable distance, however, a convenient distance of 102.4 feet is selected for the purposes of a detailed description of the invention to follow hereinafter. The output of the digital circuitry 24 is a constant number K pulses per unit length on output terminal 27. This output of K pulses per foot or ten pulses per foot as described in the detailed example to follow may be conveniently used as an input to the shear motor and control circuitry 28 as shown by dotted line 29. The control circuitry of the shear motor and control circuitry 28 may advantageously use this output of K pulses per foot to operate flying shears 30 at the proper time in order to accurately divide the moving strip material 10.

Figure 2:
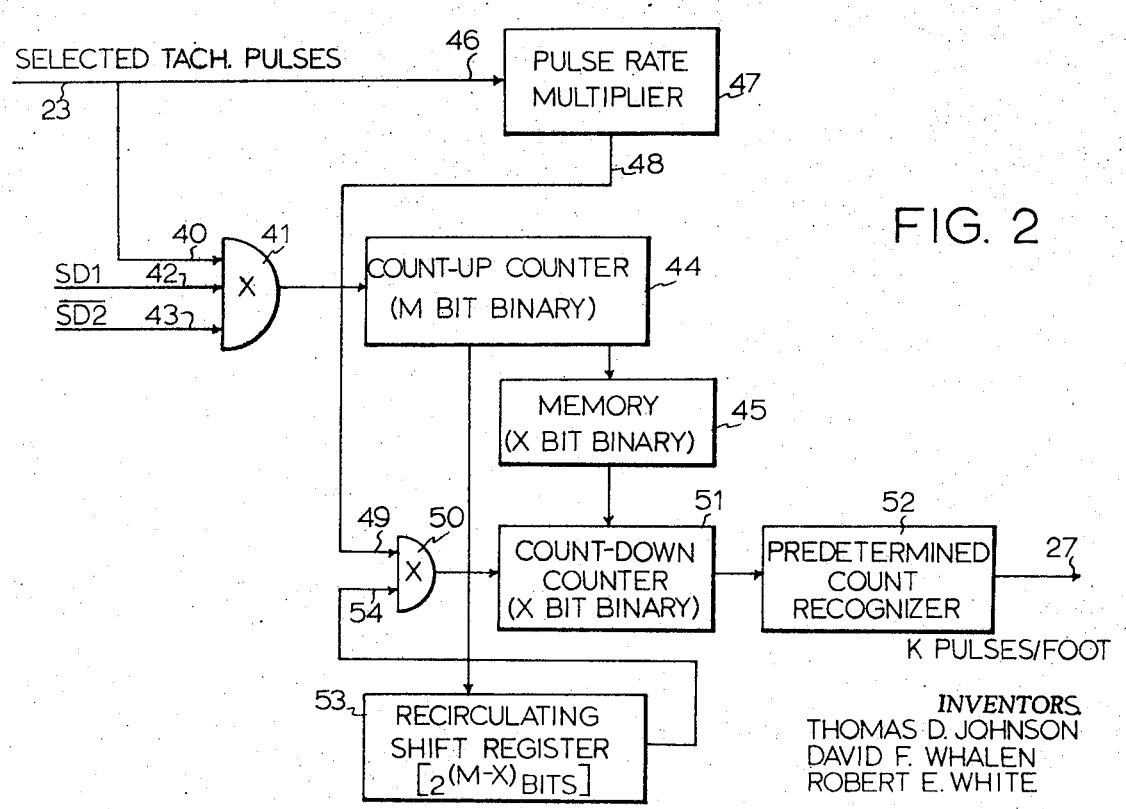
FIG. 2 is a block diagram of the digital circuitry of FIG. 1.

Referring now more particularly to FIG. 2 in which corresponding elements have the same number as in FIG. 1, there is shown a detailed block diagram of the digital circuitry 24 of FIG. 1. The shaped pulses of the selected tachometer are provided on lead 23 from the pulse tachometer select circuit 21. These selected tachometer pulses are fed to one input terminal 40 of AND gate 41. An output pulse from strip detector SD1 is fed to another input terminal 42 of AND gate 41, an inverted output from strip detector SD2 is fed to a third input terminal 43 of AND gate 41. AND gate 41 therefore gates or allows the selected tachometer pulses to pass to a count-up counter 44 during the period that strip detector SD1 senses the strip and strip detector SD2 does not sense the strip. Count-up counter 44 is thus enabled to count the selected tachometer pulses during the period of time that the leading edge of the strip travels from strip detector SD1 to strip detector SD2 or, in other words, travels a distance L. The X most significant bits of the counter are transferred to a memory 45.

The selected tachometer pulses on line 23 are also fed to input 46 of a pulse rate multiplier 47 which, in the example to be described in detail hereinafter, multiplies the pulse rate of the selected tachometer by a factor of 128. Output terminal 48 of pulse rate multiplier 47 is connected to one input terminal 49 of AND gate 50 which is usually in an enabled condition. The captured count in memory 45 which is used for calibration purposes is transferred to a count-down counter 51 each time the count-down counter 51 is counted down to a predetermined count by the output pulses of pulse rate multiplier 47 delivered through gate 50. Each time the count-down counter 51 is counted down to the predetermined count, which is zero in the preferred embodiment to be described hereinafter, the predetermined count recognizer 52 produces an output pulse at terminal 27. Pulses at terminal 27 correspond to a constant number of K pulses per foot.

It may be noted from FIG. 2, that count-up counter 44 may be an "M" bit binary counter which is a larger capacity counter than count-down counter 51 which may be an "X" bit binary counter. Only the last X bits of binary count-up counter 44 are transferred through memory 45 to count-down counter 51. Therefore, the captured count of count-up counter 44 transferred to count-down counter 51 (through memory 45) is actually divided by $2^{(M-X)}$. The first $(M-X)$ bits of count-up counter 44 are transferred to recirculating shift register 53 each time the captured count in count-up counter 44 is transferred to memory 45. That is, each time the predetermined count recognizer 52 recognizes the desired predetermined count, the most significant or the last "X" bits of the captured count in memory 45 are set into count-down counter 51. The least significant or the first $(M-X)$ bits are set into recirculating shift register 53 each time a new calibrate number is captured in the count-up counter 44. In order to avoid the loss of a fraction when the captured count in count-up counter 44 is divided by $2^{(M-X)}$, the gate 50 may drop one pulse each time the count-down counter 51 is counted down to a predetermined count depending upon the signal present on input lead 54 of AND gate 50 which in turn is dependent upon the count transferred into recirculating shift register 53.

Figure 3:
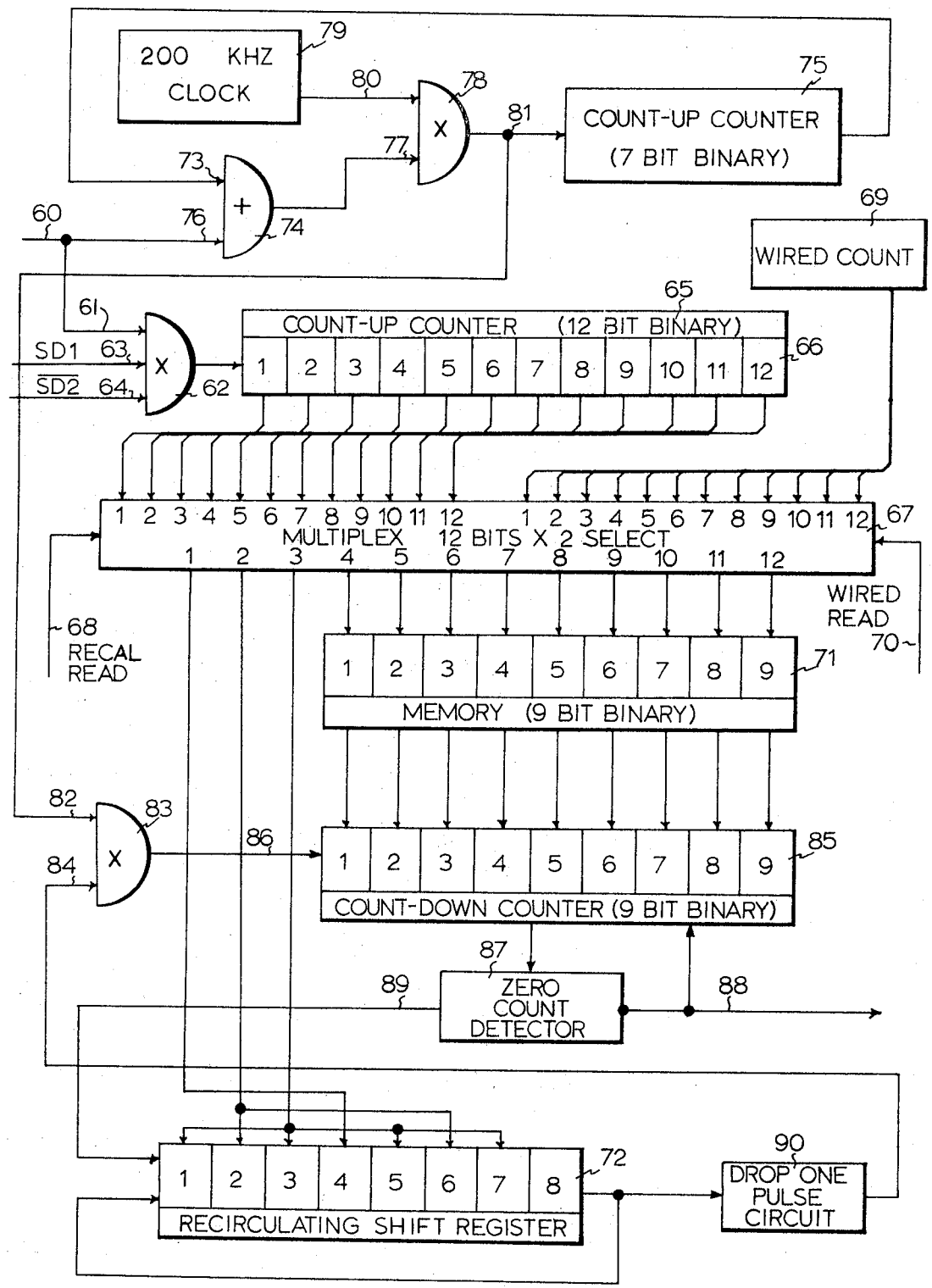
FIG. 3 is a schematic diagram partially in block diagram form more particularly showing the digital circuitry of FIG. 1.

Referring now more particularly to FIG. 3, there is shown a schematic diagram partially in block diagram form which more particularly describes the embodiment of the digital circuitry of FIG. 1. The shaped pulses from the selected tachometer are applied to line 60 and in turn applied to input terminal 61 of AND gate 62. A signal from strip detector SD1 is applied to input terminal 63 of AND gate 62 and an inverted output of strip detector SD2 is applied to input terminal 64 of AND gate 62. AND gate 62 therefore passes pulses from the selected tachometer present on line 60 whenever strip detector SD1 senses the presence of the strip and strip detector SD2 does not detect the presence of the strip. The pulses during this interval, which corresponds to the time necessary for the leading edge of the strip material to pass from strip detector SD1 to strip detector SD2, are applied to a 12 bit count-up counter 65. Thus, a count is captured in the count-up counter 65 which is dependent upon the pulse rate output of the selected tachometer and the travel time of the strip between strip detectors SD1 and SD2. These factors are in turn dependent upon a number of other factors. For example, the pulse rate output of the selected tachometer depends upon the base frequency of the tachometer, the diameter of the roll which senses the physical movement of the strip material and the speed of the moving strip. The travel time of the leading edge of the strip material between strip detectors SD1 and SD2 depends in turn upon the spacing between the strip detectors, and the speed of the traveling strip.

In order to more clearly illustrate the invention, a number of values will be assumed in the following descriptive material. However, it is understood that these values are not intended to be limiting and are assumed only for the purposes of illustration. Much larger or smaller values may be used. However, if much larger values are used, it may be necessary to increase the capacity of the counters with the general relationship between the counter capacities being illustrated in FIG. 2. That is, if the count-up counter has an M bit capacity and the count-down counter an X bit capacity, then the recirculating shift register should have a capacity equal to $2^{(M-X)}$ bits. Now for illustration, assume that the strip detectors SD1 and SD2 are located 102.4 feet apart and that the output pulse rate of the selected tachometer is 20 pulses per foot. Therefore the captured count in the count-up counter 65 would be 2048 (102.4 feet×20 pulses per foot=2048) thus the 12th bit position or the 2048 bit weight position 66 would be set and all other bit positions of count-up counter 65 would be reset.

In operation, a new count will be captured in count-up counter 65 on each new section of strip material. If it were desired to recalibrate on each new strip, a new count would be captured in count-up counter 65 and read out by a multiplex unit 67 each time the leading edge of a new section of strip passed from strip detector SD1 to strip detector SD2. A properly timed pulse on a recal read terminal 68 of multiplex unit 67 will read out the count in count-up counter 65. However, it is noted that when first starting up the mill or when starting the mill up after an idle period, it is necessary to set an estimated count. The setting of this estimated count is accomplished by a wired function represented by a wired count 69 which may be used to place an estimated count in the memory 71 via multiplex unit 67. This wired count is read out by applying a properly timed pulse on the wired read terminal 70 of multiplex unit 67.

With normal operation, the operator will select "Recalibrate" on the mode switch (not shown) and push the "Change Calibration" button (not shown) upon restarting the mill after an idle period. The system will produce output pulses with calibration based upon the wired count until a new count is captured when the leading edge of a new strip reaches detector SD2. The system will then produce output pulses with calibration based upon the most recently captured count in the count-up counter 65 until the "Change Calibration" button is again pushed. After control power is lost and then restored, the system will automatically use the wired count until a new number is captured.

When read out, the nine most significant bits through multiplex unit 67 will set memory 71 and the three least significant bits through multiplex 67 will set recirculating shift register 72. The readout is timed so that it does not interfere with the output of memory 71 or recirculating shift register 72.

The "on" time of the monostable multivibrator which shapes the pulses from the selected tachometer on line 60 is selected to be slightly less than one-half the minimum time between the tachometer pulses. Thus, the pulses on line 60 will always be "on" for less than half of the time between pulses. The pulses from the selected tachometer on line 60 are also fed to input 76 of an exclusive-or gate 74. The output of the seventh bit of count-up counter 75 is fed to input 73 of exclusive-or gate 74. The output of the exclusive-or gate will be "on" when either input is "on" and the other input is "off"; and the output of the exclusive-or gate will be "off" when both inputs are "off" and when both inputs are "on."

The output of the exclusive-or gate 74 is fed to input 77 of AND gate 78. Pulses from the 200 kilohertz clock 79 are fed to input 80 of an AND gate 78. The output of AND gate 78 is fed to and counted by counter 75.

This arrangement provides 128 pulses on line 81 for each tachometer pulse period on input 73 of exclusive-or gate 74. This is accomplished since the AND gate 78 is allowed to pass 64 pulses while the tachometer pulse is present on input 73 and then an additional 64 pulses when the tachometer pulse is absent and the output of the 7 bit of count-up counter 75 changes state. The circuit therefore performs as a multiply-by-128 pulse rate amplifier.

The pulse on line 81 are applied to input 82 of AND gate 83. Input 84 of AND gate 83 is normally in an enabling condition, and therefore these pulses on line 81 are fed to count-down counter 85 by line 86. As such, the count in count-down counter 85, which is initially the captured count of counter 65 (or the wired count) divided by eight, is counted down at a rate 128 times the pulse rate of the selected pulse tachometer. Each time the count-down counter 85 is counted down to a zero count, zero count detector 87 produces an output pulse on lines 88 and 89.

The pulse on line 88 is used as an output pulse and to set a new count into counter 85. It is noted that counter is counted down at an effective rate 1024 times (8×128) the rate that counter 65 is counted up. Since the strip detectors SD1 and SD2 are located 102.4 feet apart, this produces an output pulse calibration on line 88 of 10 pulses per foot of strip material passing a particular point in the mill. In order to illustrate the recirculating shift register 72 and the drop one pulse circuit 90, assume that the output of the selected tachometer is 20.1 pulses per foot. This would produce a captured count of 2,058 in counter 65 with the strip detectors SD1 and SD2 located 102.4 feet apart. A count of 2,058 in counter 65 would set the 2, 4 and 12 bit positions of counter 65. Upon applying a signal to input 68 of multiplex unit 67, the 2 and 6 bit positions of recirculating shift register 72 and the 1 and 9 bit positions of counter 85 would be set. Recirculating shift register 72 is shifted one position to the right each time a pulse is generated on output line 89 of the zero count detector 87. Each time a "1" or a set signal is shifted into bit positions 8 of recirculating shift register 72, the drop one pulse circuit, by means of a one shot or other suitable means, generates a pulse which is felt on input 84 of AND gate 83 which drops one pulse from being applied to counter 85. Therefore, with the 2 and 6 bit positions of recirculating shift register 72 being set, one pulse is dropped or prevented from being applied to count-down counter 85 during each fourth count-down. This effectively allows counter 85 to be counted down to zero by 257 pulses for three times in a row and then requires 258 pulses for the fourth count-down and therefore allows division by a fraction. In other words, the fraction compensated for in the example just illustrated was 2/8, which effectively compensates for the count which would have been lost by dropping the count in the first three bit positions of counter 65. By disposing the count into recirculating shift register 72, the fraction is compensated for in an evenly distributed manner with respect to time or with respect to the 10 pulses per foot output on line 88. The result is a small transient error in output pulse timing. In practical use, this is acceptable because the error is not cumulative; that is, any given number of output pulses on line 88 will be produced by the correct number of pulses on line 86 with a maximum error equivalent to less than one count on line 86. If, for example, the 2/8 fraction just described was compensated for by setting the 1 and 2 bit positions of recirculating shift register 72, the compensation for the fraction would be unevenly distributed causing an increased transient error. The same results can be obtained (without the transient error) and recirculating shift register 72 can be eliminated if the bit capacity of memory 71 and count-down counter 85 is increased from 9 to 12 and if the frequency of clock 79 is increased from 200 kilohertz to 1.6 megahertz. The recirculating shift register 72 is used to provide the desired operation without the increased timing and electrical noise difficulties of the higher clock frequency.

The invention may also be practiced by using a computer where convenient to do so. For example, a digital computer may be programmed to capture a count by counting the number of pulses generated by a tachometer during the time that the leading edge of the strip travels from strip detector SD1 to strip detector SD2. This captured count may then be counted down to a predetermined count at a rate dependent upon the tachometer output pulse rate multiplied by a factor dependent upon the desired number of pulses per foot and the distance between the strip detectors SD1 and SD2. The program would also include a provision to produce an output pulse each time the captured count was counted down to a predetermined count which in a preferred embodiment would be zero.

It will be apparent to those skilled in the art that the self-calibrating monitoring system described herein may be used for monitoring the speed or total length passing a particular point of any type of moving strip material. It is also apparent that various changes and modifications may be made in the circuitry, or different devices used to produce the same function in the circuit. For example, decimal type counters may be substituted for binary counters, down counters substituted for up counters and/or vice versa, or the capacity of the various counters could be expanded or contracted. Also, a computer could be programmed to practice the method of the invention.

In view of the above, it will be apparent that modifications and variations are possible within the scope and spirit of the above teachings. It therefore is to be understood that within the scope of appended claims, the invention may be practiced other than as specifically described.

What is claimed as new and desired to be secured by Letters Patent of the United States is:

1. A system for producing a constant number of pulses per unit length of strip passing a point, comprising:
   means adapted to generate pulses at a rate in response to strip movement along a path of travel;
   means to provide a signal proportional to the time required for a point on said strip to travel between two points along the path of strip travel;
   means for capturing a count which is a function of said rate and said signal;
   means to multiply said rate by a predetermined constant to generate a product; and
   means for dividing said product by said count to produce a constant number of pulses per unit length of strip.

2. A system for producing a constant number of pulses per unit length of strip passing a point as recited in claim 1 wherein means for providing an estimated value of said count for initial operation is provided.

3. A system for producing a constant number of pulses per unit length of strip passing a point as recited in claim 1 wherein said means for dividing includes a counter for receiving said count at predetermined times, said counter responsive to said product to count to a predetermined number and to produce a signal upon reaching said number.

4. A system for producing a constant number of pulses per unit length of strip passing a point, comprising:
   means adapted to receive pulses in response to said strip movement;
   a first counter means;
   means for producing a predetermined number of pulses in response to each pulse responsive to said strip movement and supplying said predetermined number of pulses to said first counter means;
   a first strip detector means located at a first point for detecting the strip;
   a second strip detector means located at a second point for detecting the strip;
   a second counter means;
   means for providing said second counter means with pulses responsive to said strip movement when the leading edge of the strip is between said first and second strip detector means;
   a memory means;
   means for transferring the count of said second counter means to said memory means when said count is completed;
   means for transferring the count in said memory means to said first counter means when the count in said first counter means equals a predetermined count; and
   means for providing an output pulse when said count in said first counter means equals said predetermined count.

5. A system for producing a constant number of pulses per unit length of strip passing a point comprising:
   means adapted to generate pulses in response to strip movement along a path;
   a first detector means located at a first position along the strip path for sensing the strip;
   a second detector means located at a second position along the strip path for sensing the strip;
   a first counter means;
   a second counter means;

means for allowing said second counter means to count said pulses produced in response to strip movement during the interval that the leading edge of the strip is between said first detector means and said second detector means to generate a count in said second counter means;

a memory means;

means for transferring the count of said second counter means to said memory means when said count is completed;

means for setting said count of said memory means into said first counter means when said first counter means has a predetermined count therein;

means for producing a predetermined number of pulses in response to each pulse responsive to strip movement and supplying said predetermined number of pulses to said first counter means for counting said first counter means to said predetermined count; and means for providing an output pulse when the count in said first counter means equals said predetermined count.

6. A system for producing a constant number of pulses per unit length of strip passing a point as recited in claim 5 wherein said first counter means and said second counter means are binary counters.

7. A system for producing a constant number of pulses per unit length of strip passing a point as recited in claim 6 wherein said second counter means includes M binary bit positions and said first counter means includes X binary bit positions and wherein M represents a number larger than X;

a recirculating shift register means having $2^{(M-X)}$ bit positions, the count contained in the first $(M-X)$ bit positions of the second counter means being set into said recirculating shift register means, said recirculating shift register means being stepped when the count in said first counter means equals said predetermined count; and means for sensing one of the bit positions of said recirculating shift register means and dropping one of said predetermined number of pulses supplied to said first counter means when said sensed bit position of said recirculating shift register means is in a predetermined condition.

8. A system for producing a constant number of pulses per unit length of strip passing a point as recited in claim 7 wherein the count contained in the first $(M-X)$ bit positions of the count-up counter means is set into said recirculating shift register in a predetermined dispersed manner.

9. A method for producing a constant number of pulses per unit length of strip passing a point by using a computer comprising the steps of:

generating a signal which indicates the travel time of a point on the strip between two points on the strip path;

generating pulses at a rate in response to strip movement;

counting said pulses responsive to strip movement during the travel time of a point on the strip material between said two points on the strip path;

storing the results of the counting step;

counting-down said stored count at a rate which is the product of the rate of the generated pulses and a predetermined constant; and generating an output pulse when said stored count being counted down equals a predetermined count.

References Cited

UNITED STATES PATENTS

| | | | |
|---|---|---|---|
| 3,497,683 | 2/1970 | Jordan et al. | 235—92 PE |
| 3,050,857 | 8/1962 | Pierce et al. | 235—92 DN |
| 3,145,294 | 8/1964 | Jackson | 235—92 DN |

DARYL W. COOK, Primary Examiner

J. M. THESZ, Assistant Examiner

U.S. Cl. X.R.

235—92 PL, 92 DE, 92 R, 92 DN, 103, 151.32